(12) United States Patent
Rajsic et al.

(10) Patent No.: US 7,822,036 B2
(45) Date of Patent: Oct. 26, 2010

(54) METHOD AND SYSTEM FOR POLICY-BASED ROUTING IN A PRIVATE NETWORK-TO-NETWORK INTERFACE PROTOCOL BASED NETWORK

(75) Inventors: Carl Rajsic, Nepean (CA); Dale Kevin Burnett, Ottawa (CA)

(73) Assignee: Alcatel Lucent, Paris (FR)

( * ) Notice: Subject to any disclaimer, the term of this patent is extended or adjusted under 35 U.S.C. 154(b) by 514 days.

(21) Appl. No.: 11/727,515

(22) Filed: Mar. 27, 2007

(65) Prior Publication Data

US 2008/0240102 A1 Oct. 2, 2008

(51) Int. Cl.
*H04L 12/28* (2006.01)
(52) U.S. Cl. ...................................... 370/392
(58) Field of Classification Search ............ None
See application file for complete search history.

(56) References Cited

U.S. PATENT DOCUMENTS

| 6,717,920 | B1 * | 4/2004 | Cheng ................... 370/255 |
| 6,967,927 | B1 * | 11/2005 | Dugeon et al. ........... 370/236.1 |
| 2002/0023174 | A1 * | 2/2002 | Garrett et al. ........... 709/245 |
| 2002/0194317 | A1 * | 12/2002 | Kanada et al. ........... 709/223 |
| 2008/0089334 | A1 * | 4/2008 | Soja-Molloy et al. ..... 370/392 |
| 2008/0186897 | A1 * | 8/2008 | Rune et al. ............. 370/315 |

OTHER PUBLICATIONS

Aldinger, et al., Policy Routing Version 1.0, The ATM Forum Technical Committee, pp. 1-153, Apr. 2003.
Aldinger, et al., Addendum to Policy Routing Version 1.0 for a Policy Constraint MIB, The ATM Forum Technical Committee, pp. 1-20, Feb. 2004.
Ahmed, et al., Private Network-Network Interface Specification Verision 1.1 (PNNI 1.1) Apr. 2002, The ATM Forum Technical Committee, pp. 1-514.

* cited by examiner

*Primary Examiner*—Melanie Jagannathan
*Assistant Examiner*—John Blanton
(74) *Attorney, Agent, or Firm*—Kramer & Amado, P.C.

(57) ABSTRACT

A method for policy-based routing of calls between nodes in a network, comprising: entering policy constraint indices for selected addresses in respective entries of an address translation table, the address translation table for accessing by a first node of the network to selectively translate attributes of calls based on respective addresses prior to transmission over the network to a second node, the policy constraint indices pointing to respective policy constraints for routing calls between the first and second nodes; receiving a call at the first node, the call including an address; accessing the address translation table using the address to determine whether the call requires assignment of a policy constraint by presence of an entry for the address in the address translation table and by presence of a policy constraint index in the entry; and, if the call requires assignment of a policy constraint, identifying a policy constraint with the policy constraint index, assigning the policy constraint to the call, and routing the call between the first and second nodes in accordance with the policy constraint.

20 Claims, 4 Drawing Sheets

METHOD AND SYSTEM FOR POLICY-BASED ROUTING IN A PRIVATE NETWORK-TO-NETWORK INTERFACE PROTOCOL BASED NETWORK

FIELD OF THE INVENTION

This invention relates to the field of network management and service provisioning, and more specifically, to a method and system for policy-based routing in a private network-to-network interface ("PNNI") based network.

BACKGROUND OF THE INVENTION

The PNNI protocols are defined in the "Private Network-Network Interface Specification Version 1.1" (af-pnni-055.002, April 2002) by The ATM Forum. This document defines the PNNI protocol for use between private ATM switches, and between groups of private asynchronous transfer mode ("ATM") switches. In general, PNNI includes two categories of protocols. First, a routing protocol is defined for distributing topology information between switches and clusters of switches. This information is used to compute paths through the network. A hierarchy mechanism ensures that this protocol scales well for large ATM networks. A key feature of the PNNI hierarchy mechanism is its ability to automatically configure itself in networks in which the address structure reflects the topology. PNNI topology and routing is based on the link-state routing technique. Second, a signalling protocol is defined for signalling, that is, message flows used to establish point-to-point and point-to-multipoint connections across the ATM network. This protocol is based on The ATM Forum's user to network interface ("UNI") signalling, with mechanisms added to support source routing, crankback, and alternate routing of call setup requests in case of connection setup failure.

Policy routing extensions to PNNI are defined in "Policy Routing Version 1.0" (af-cs-0195.000, April 2003) by The ATM Forum. Policy routing as specified in this document gives a network administrator control over the way connections are routed across a PNNI routing domain based on network specific criteria and resource utilisation strategies. For this purpose, the concept of Network Service Categories ("NSCs") was introduced. Specifically, policy routing allows a network administrator to manage network entity resources on a per NSC basis, in addition to the per ATM Service Category ("ASC") basis that was already available in PNNI. In particular, in the absence of policy routing, PNNI allows nodes in a PNNI routing domain to route connections while taking into account the state of the resources of the links and nodes within that domain. This is achieved by providing each node (e.g., switch, router, etc.) with a detailed map of the available resources for each ASC supported by each network entity (e.g., link, etc.). PNNI allows an ATM network operator to partition the resources on network entities per ASC, apply different overbooking factors per ASC, or even allocate different amounts of resources to different ASCs. It is even possible to preclude connections of a given ASC to be routed on certain network entities by excluding available resources for that ASC from the network entity's advertisements. This set of features is a powerful and useful capability for service providers ("SPs"). However, as ATM networks evolve to support a greater variety of services, SPs need to be able to manage the resources inside their ATM network at a finer level. They also need to be able to implement certain control policies defining how connections are routed through a PNNI routing domain. A simple example is the capability for a SP to differentiate the resources that can be accessed by end-user generated switched virtual connections ("SVCs") and network management system ("NMS") generated soft permanent virtual connections ("SPVCs"). Since one of the main attributes of an SPVC service is the resiliency offered through dynamic rerouting, it is important to make sure that in a network also offering SVC service, the resources that will allow successful rerouting of SPVCs in case of a failure are not consumed by SVCs. In the absence of policy routing, the policies that can be implemented in a PNNI routing domain rely primarily on the ASC as the differentiating criteria. As the previous example shows, SPs need to be able to go beyond that. Hence, the concept of NSCs was introduced. In the above example, one could identify two NSCs: the SVC network service category and the SPVC network service category. Each NSC has different applications and needs to be managed differently.

According to Policy Routing Version 1.0, a "policy constraint" comprises the complete set of policy information associated with a given connection in order to provide service specific "directions" for connection routing. A policy constraint consists of a single policy or a list of policies stated in order of preference. Each policy consists of a set of rules that allow access, or restrict access, to tagged resources. These rules are expressed using one or two policy operators (one for "require" and one for "must avoid"), each applying to one list of NSCs (containing a list of Network entity NSCs ("Ne-NSCs") and/or a list of Resource partition NSCs ("Rp-NSCs")). (Note that a Ne-NSC is an NSC that applies to the whole network entity (including all resources) and advertises properties of the network entity whereas a Rp-NSC is an NSC that applies to a resource partition of a network entity, a network entity referring to a horizontal link, an uplink, a node, a spoke, a bypass or a set of reachable ATM addresses.) All the rules contained in at least one of the policies listed in a policy constraint must be met during connection routing for the connection to be progressed. When performing path selection using a policy, the topological map of the PNNI routing domain is "pruned", leaving only the network entities and resources that match the policy. Without policy routing, the applicable generic connection admission control ("GCAC") algorithm for a connection is performed on a set of resources equal to the resources of the entire routing domain. With policy routing, GCAC for a given connection is performed on a subset of resources that match one policy in the policy constraint associated with the connection.

In addition, "Addendum To Policy Routing V1.0 for a Policy Constraint MIB" (af-cs-0198.000, February 2004) by The ATM Forum further refines policy routing for PNNI. This specification provides a management information base ("MIB") having a common means of defining policy constraints so that they can later be referenced by other applications. The policy constraint MIB is organized as two main tables: the "Policy Constraint Table" and the "Policy Table". The Policy Constraint Table provides the entries that can be referenced by other MIB objects to utilize a policy constraint. Each entry in the table contains a set of up to six pointers into the Policy Table. The Policy Table specifies the operators of a policy. Associated with the Policy Table are the "Policy Network entity NSC Table" (or "policyNeNscTable") and the "Policy Resource partition NSC Table" (or "policyRpNscTable"). These two tables contain the lists of NSCs on which the policy operators operate. To create a policy, the network management system ("NMS") (e.g., an operator of a NMS) first creates an associated instance of a row status in a "policyEntry", using a value of a "policyindex" that is not currently in use. Second, the NMS associates instances of Ne-NSC and Rp-NSC lists for the policyindex. Third, the NMS specifies values for the policy operators. Once the appropriate instance of all configuration objects have been created for the policyEntry, policyRpNscEntry, and the policyNeNscEntry (as appropriate), the row status of the policyEntry is set to active to activate the policy.

One problem with current PNNI based networks implementing the above specifications is that particular SVC-based switched service calls from a single user to network interface ("UNI") or network to network interface ("NNI") from network equipment that does not support policy routing, cannot be targeted to specific trunk group partitions or make use of specific network resources through policy routing on a per call or per service basis (e.g., user A's calls get policy Y and user B's calls get policy X). In particular, it is not possible to select appropriate policies that can be added to SVC-based calls to allow for proper path selection of network resources for such calls. In addition, it is possible that some SVC-based calls (e.g., user calls from customer premises equipment not supporting policy routing) may be permanently blocked as a result of all of the available bandwidth being used by another type of service (e.g., SPVCs after a reroute) as policies cannot be added to SVC-based calls on a per call or per service basis. In summary, SVC-based calls cannot be prioritized (from a network usage point of view) at the call level to participate in policy-based routing based on the called or calling party numbers (and subsequently the associated SVC service). This is problematic in that some SPs require the ability to select paths across regions based on calling or called party numbers.

A need therefore exists for an improved method and system for policy-based routing in a private network-to-network interface ("PNNI") based network. Accordingly, a solution that addresses, at least in part, the above and other shortcomings is desired.

SUMMARY OF THE INVENTION

According to one aspect of the invention, there is provided a method for policy-based routing of calls between nodes in a network, comprising: entering policy constraint indices for selected addresses in respective entries of an address translation table, the address translation table for accessing by a first node of the network to selectively translate attributes of calls based on respective addresses prior to transmission over the network to a second node, the policy constraint indices pointing to respective policy constraints for routing calls between the first and second nodes; receiving a call at the first node, the call including an address; accessing the address translation table using the address to determine whether the call requires assignment of a policy constraint by presence of an entry for the address in the address translation table and by presence of a policy constraint index in the entry; and, if the call requires assignment of a policy constraint, identifying a policy constraint with the policy constraint index, assigning the policy constraint to the call, and routing the call between the first and second nodes in accordance with the policy constraint.

In the above method, the network may be an asynchronous transfer mode ("ATM") network. The asynchronous transfer mode ("ATM") network may be a private network-to-network interface ("PNNI") based network. The policy constraint may be a private network-to-network interface ("PNNI") policy constraint for policy-based routing. The policy constraint may include one or more rules for accessing network resources for the call. The call may be a switched virtual connection ("SVC") based call. The address may be one of a called address and a calling address. The method may further include accessing the address translation table using the address to determine whether the call requires translation of one or more attributes of the call by presence of an entry for the address in the address translation table; and, if the call requires translation of one or more attributes of the call, the one or more attributes may be identified from the entry and the one or more attributes may be translated in accordance with the entry. The one or more attributes may include a prefix for the address. And, the first and second nodes may be first and second routers, respectively, and the step of entering may be performed by a network management system which transmits the address translation table to the first node.

In accordance with further aspects of the present invention there is provided an apparatus such as a data processing system (e.g., a network management system ("NMS"), a node, a switch, a router, etc.), a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data, including the network nodes and network management systems described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware.

According to one embodiment, the invention allows a policy constraint to be assigned to an address translation table entry. As a result, policy-based routing can be used at the SVC call level based on the called or calling party numbers of the call to determine how the call will progress through the network (depending on who is called or who is doing the calling). This improves network usage, particularly with respect to bandwidth usage. By assigning a policy constraint to an address translation table entry, in the event a call setup attempt matches an address translation table entry, the policy constraint is assigned to the call setup attempt. In general, this only applies for incoming calls. As the address translation functionality and the associated policy constraint(s) in the address translation table are independent, the policy constraint is applied based on the received called/calling party number prior to translation. A network node may then perform path selection based on the policy constraint assigned to the setup message. This allows for network routing decisions to be made for SVCs at the call level, based on the calling or called party number. In addition, this provides SVCs with the same level of granularity (from a policy-based routing point of view) as SPVCs (i.e., per call instead of per UNI). As a result, this allows SPs to better provision their network for optimal bandwidth usage. Furthermore, it provides SPs with the ability to select paths across regions based on calling or called party numbers.

Figure 1:
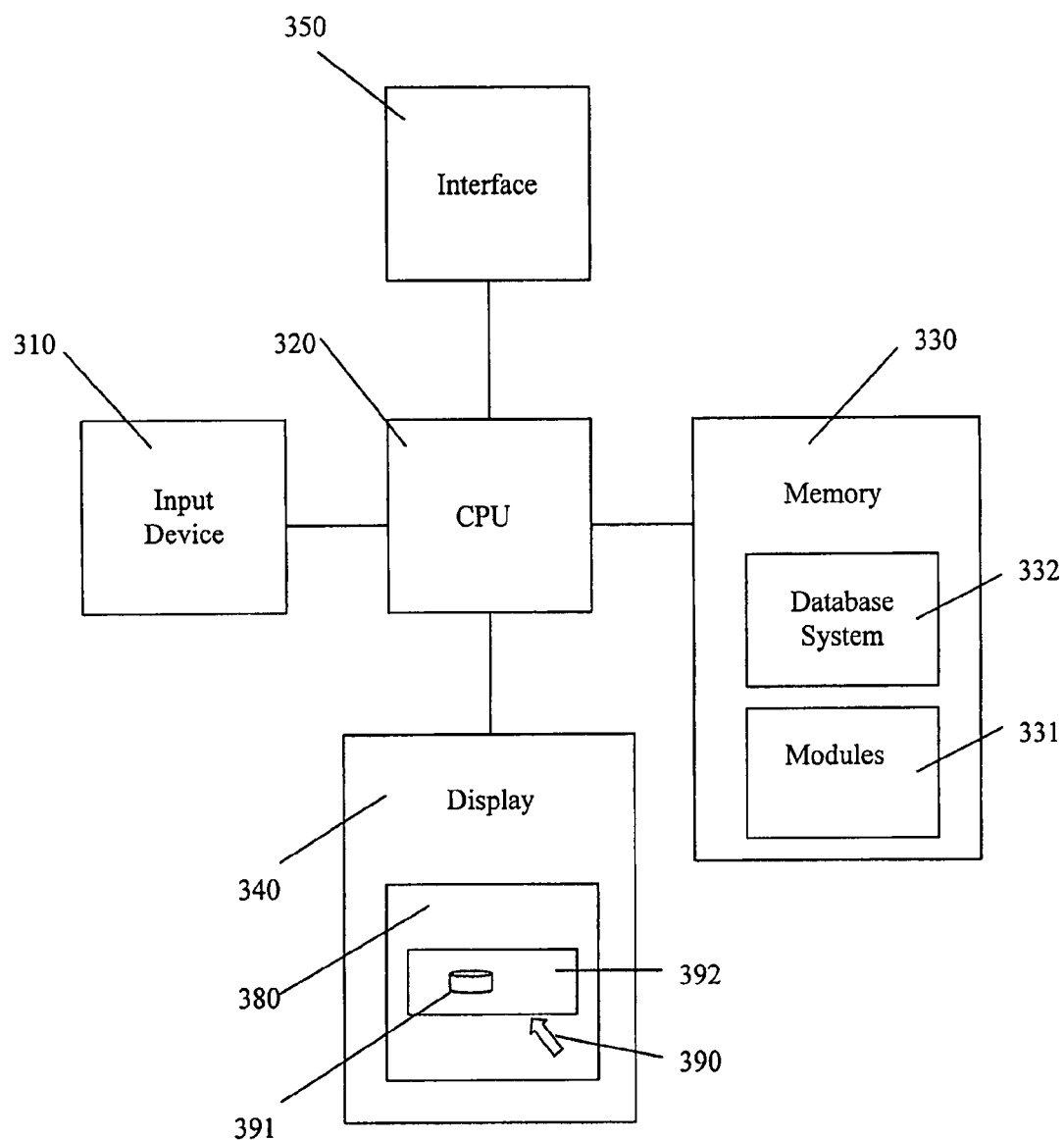
FIG. 1 is a block diagram illustrating a data processing system adapted to implement an embodiment of the invention.

FIG. 1 is a block diagram illustrating a data processing system 300 adapted to implement an embodiment of the invention. The data processing system 300 is suitable for operation as a network management system ("NMS") or network node (e.g., router, switch, etc.). The data processing system 300 includes a central processing unit ("CPU") 320, memory 330, and an interface device 350 and may optionally include an input device 310 and a display 340. The CPU 320 may include dedicated coprocessors and memory devices. The CPU 320 is operatively coupled to memory 330 which stores an operating system (not shown) for general management of the system 300. The memory 330 may include RAM, ROM, disk devices, and databases. The memory 330 may include a variety of storage devices including internal memory and external mass storage typically arranged in a hierarchy of storage as understood to those skilled in the art. The interface device 350 may include one or more network connections. The data processing system 300 is adapted for communicating with other data processing systems (e.g., nodes A, B, C, D in FIG. 2) over a network (e.g., ATM network 100 in FIG. 2) via the interface device 350. The input device 310 may include a keyboard, a mouse, a trackball, or a similar device. The display 340 may include a computer screen, terminal device, or a hardcopy producing output device such as a printer or plotter. The CPU 320 of the system 300 is typically coupled to one or more input devices 310 for receiving user commands or queries and for displaying the results of these commands or queries to the user on the display 340. Commands and queries may also be received over a network connection, and results may be transmitted over a network connection. The data processing system 300 may include a database system 332 for storing data and programming information. The database system 332 may include a database management system ("DBMS") and a database and may be stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules (not shown) or software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300.

Optionally, a user may interact with the data processing system 300 and its hardware and software modules 331 using a graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input or pointing device such as a mouse 310. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input or pointing device (e.g., a mouse) 310 to position a pointer or cursor 390 over an object (e.g., an icon) 391 and by "clicking" on the object 391. Typically, a GUI based system presents application, system status, and other information to the user in "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 2:
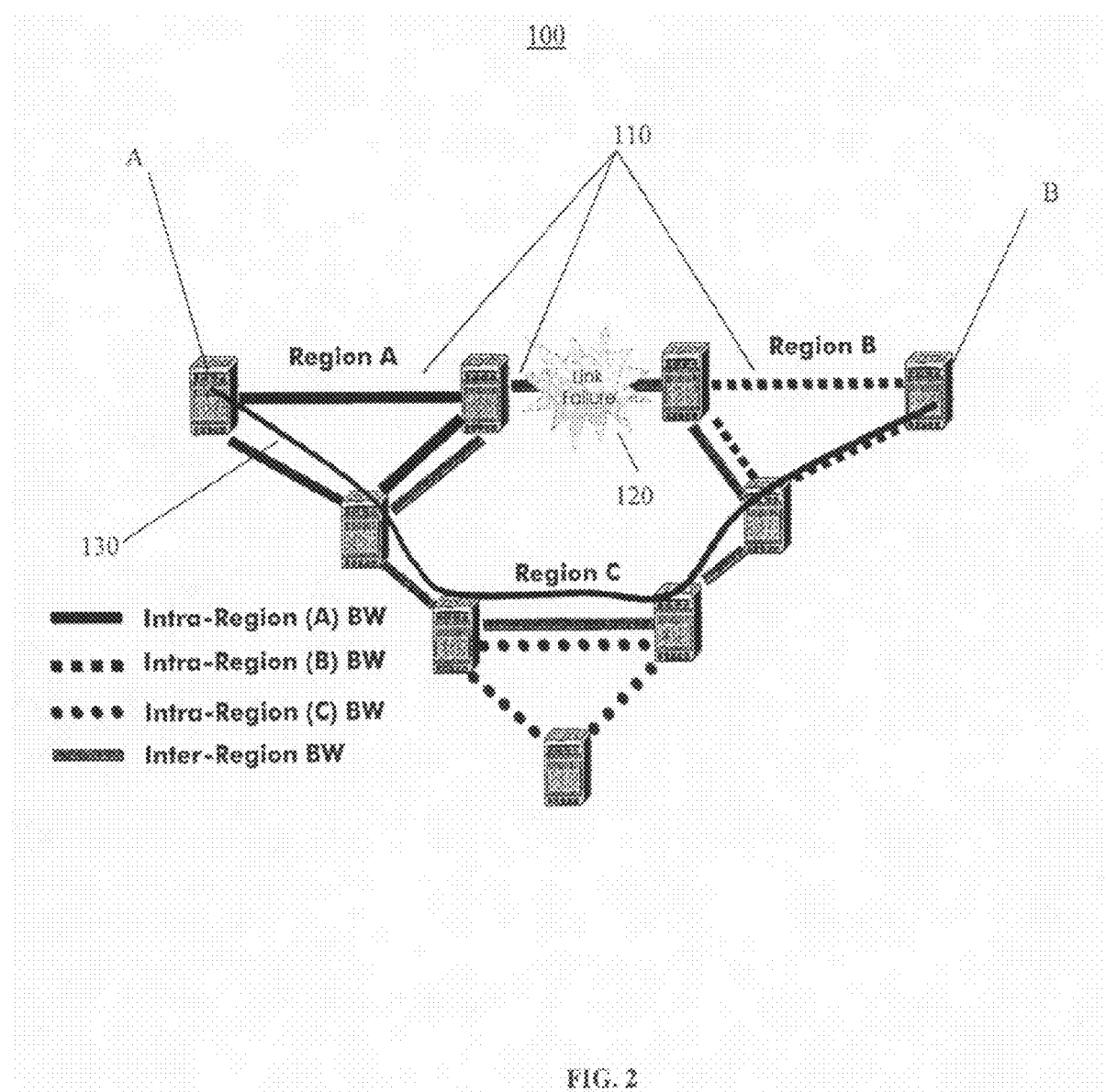
FIG. 2 is a block diagram illustrating an ATM network using address translation and policy-based routing in accordance with an embodiment of the invention.

FIG. 2 is a block diagram illustrating an ATM network 100 using address translation and policy-based routing in accordance with an embodiment of the invention. The network 100 includes network nodes (e.g., A, B) coupled by links 110. The network nodes A, B may be configured and controlled by a NMS (e.g., data processing system 300 in FIG. 1). Address translation refers to the ability of a network node (e.g., A) to change attributes of a call (e.g., an SVC-based call) based on information including called and calling party numbers or addresses. By configuring address translation table entries to include a policy constraint, increased flexibility is provided allowing SPs to provide different path selection criteria based on the policy constraint associated with the called or calling party number. The ability to assign policy constraints to calls allows a SP to partition services onto network resources assigned for that service, or to use bare resources. Assigning policy constraints to calls allows the SP to ensure that, for example, SVC calls do not impact SPVCs or vice-versa.

Referring to FIG. 2, during network failures, or periods of heavy call volumes, calls between two regions (e.g., region A and region B) may transit a third region (e.g., region C) due to unavailability of facilities or bandwidth between the called and calling region. The network nodes (e.g., A, B) are capable of limiting the amount of local and transit traffic allowed in and through a region. The calling region's node (e.g., A) is capable of selecting a path to a destination region (e.g., region B), known as inter-region calls, by utilizing bandwidth ("BW") set aside for that purpose effectively limiting the transit BW across regions. If there is limited BW available for inter-region calls, due to link failures (e.g., 120) or BW restraints, then the source node (e.g., A) can select alternate paths ensuring only BW designated for such purposes. If there is sufficient BW between regions, then the primary path between regions is selected utilizing the trunks that are available for establishing those calls to the remote region. The SP has the flexibility to: (1) allow calls within a region (known as intra-region calls); (2) take priority over inter-region calls, depending on the BW assignments made to facilities in the network 100; or, (3) not take priority over inter-region calls. The mechanism used to achieve this flexible control is policy-based routing.

FIG. 2 illustrates the capabilities that are described above. For intra-region calls (not shown) in region A, a policy constraint is used to specify that only "Intra-Region (A) BW" is allowed for those calls. This restricts those calls from ever transiting region B or region C. For inter-region calls 130 from region A to region B, a policy constraint is used to specify that only "Intra-Region (A) BW" or "Intra-Region (B) BW" or "Inter-Region BW" is available for those calls. In this case, if a link 110 that directly joins those regions fails, or if BW is constrained, then the source node A in region A selects an alternate path through region C. This path, however, is further constrained to only use "Inter-Region BW" assigned for transiting calls in region C. Other BW set aside for intra-region calls in region C cannot be used by transiting calls from A to B or vice versa. As illustrated in FIG. 2, policy-based routing can be used to modify these scenarios in a variety of ways to meet the needs of a SP's intra- and inter-region call policies. According to one embodiment, the called/calling party number or address may be used to determine which Inter/Intra-Region (A, B, C) BW to select and therefore which policy.

As mentioned above, address translation refers to the ability of a network node (e.g., A) to change call attributes in the SVC based on called and calling party numbers or addresses. For example, ATM signalling requires addressing in E.164 International or ATM endsystem address ("AESA") numbering plans. The purpose of address translation is to convert call attributes based on called and calling party addresses to one of these supported address formats by inserting, removing or modifying attributes such as address digits and/or translating type-of-number ("TON") and numbering-plan-identification ("NPI") values. Address translation takes place on both addresses independently. Address translation is required because equipment or services external to the node (e.g., A) do not necessarily use the same address formats as ATM networks. Address translation takes the received foreign addresses and maps them to routable addresses for routing within the node A and across an ATM network 100. Correspondingly, address translation also takes routable addresses and maps them to foreign addresses for routing outside the ATM network 100.

Address translation is carried out based on the called and calling party numbers or addresses received on signalling links. Each signalling link is associated with either one or zero address translation tables. If a signalling link is associated with zero address translation tables then no address translation is performed for calls on that signalling link. Each address translation table contains a variable number of translation entries. These translation entries are the rules used to perform address translation. Address translation tables ease the task of configuring address translation attributes for several signalling links. In addition, a table reduces the amount of non-volatile storage required to store an address translation configuration within a node (e.g., A) since multiple physical accesses can reference a common address translation table. Typically, a node A may support a fixed number of address translation tables. If any information contained in an address translation table is changed, all signalling links pointing to that table are affected. Any subsequent messages received over those signalling links use the new address translation information. Existing calls are unaffected.

Address translation is a feature that affects the called and/or calling party number information elements or attributes received on a signalling link. This allows the node A to translate addresses received in foreign formats to the routable address formats by inserting, removing or modifying address digits and modifying the NPI and TON. This function allows for the following. First, it allows for addresses received by the node A in foreign format (e.g., Private) to be translated into a routable format (e.g., E.164) and then routed across the network 100. Second, it allows addresses in a routable format (e.g., E.164) to be translated to a foreign format (e.g., Private) and then be sent to external services. Third, it allows address digits to be changed. Fourth, it allows address TON and NPI to be changed. These tasks are carried out through the use of address translation tables.

As mentioned above, address translation tables provide the mechanism for address translation. Related to address translation tables/entries are address translation profile groups/profiles. Address translation profile groups are numbered from one to the maximum number of profile groups supported in the network 100 by the NMS 300. The number of address translation tables supported on a node (e.g., A) is typically a subset of the total number of profile groups supported by the NMS 300. Address translation profile groups are usually created by a user or network administrator on the NMS 300 and used by nodes (e.g., A) that have signalling links. Therefore, if a NMS 300 is being used to manage the network 100, the NMS 300 typically controls the address translation profile group number space, since they are network wide values. The NMS 300 also tracks the number of address translation profile groups associated with each node A, B to ensure it does not configure more tables on a node than the node can support. Address translation tables can also be configured locally at a node (e.g., the node has data processing system 300 functionality).

Similarly, address translation profiles are numbered from one to the maximum number of profiles supported in the network 100 by the NMS 300. The number of address translation table entries supported on a node A is typically a subset of the total number of profiles supported by the NMS 300. Address translation profiles are usually created by a user or network administrator on the NMS 300. Each profile or entry as it is referred to on the node is associated with one or more address translation tables on the node. A constraint on the node exists such that if an address translation table entry "X" exists in more than one address translation table, the node uses database space for each table that the entry "X" belongs to. For example, if a user or network administrator configures an address translation table entry to exist in address translation tables 1 and 2, and address translation tables 1 and 2 are downloaded to a node (e.g., A) from the NMS 300, then that node uses two address translation table entry locations in its database even though the data contained in the entries is identical. There is no limit to the number of entries that can be configured in an address translation table, besides the maximum number of entries allowed on a node given the previous constraint. Once the maximum number of entries has been configured, no new entries can be added until an existing entry is deleted.

Each address translation table entry may include the following information fields: (1) Table Number (e.g., 1 to N); (2) Entry Number (e.g., 1 to N); (3) Direction (e.g., incoming, outgoing, both); (4) Process Called Address (e.g., enable, disable); (5) Process Calling Address (e.g., enable, disable); (6) External Translation Prefix (e.g., NTXX.X); (7) Internal Translation Prefix (e.g., NTXX.X); (8) Transport Termination Address (e.g., NTXX.X); (9) Transport Origination Address (e.g., NTXX.X); (10) Clear Incoming Called (e.g., enable, disable); (11) Statistics Incoming Called (e.g., enable, disable); (12) Clear Incoming Calling (e.g., enable, disable); (13) Statistics Incoming Calling (e.g., enable, disable); (14) Clear Outgoing Called (e.g., enable, disable); (15) Statistics Outgoing Called (e.g., enable, disable); (16) Clear Outgoing Calling (e.g., enable, disable); (17) Statistics Outgoing Calling (e.g., enable, disable); and, (18) Policy Constraint Index (e.g., none, 1-N).

To support PNNI policy-based routing, a policy constraint can be associated with an address translation table entry via the policy constraint index field. By assigning a policy constraint to an address translation table entry, the user or network administrator is able to request and/or avoid a certain set of NSCs when the SVC is established based on its called or calling party number. The policy constraint configured against the address translation table entry in no way impacts other existing address translation functionality. It simply facilitates an effective way to associate a policy constraint with an SVC call.

In the event a call setup attempt matches an address translation table entry, the policy constraint is assigned to the call setup attempt. This only applies for incoming calls. As the address translation functionality and the associated policy constraint(s) in the address translation table are independent, the policy constraint is applied based on the received called/calling party number prior to translation. The node (e.g., A) then performs path selection based on the policy constraint assigned to the setup message. A policy constraint will not be applied (or affect the policy constraint already associated with the call) if its administrative status is disabled.

In general, if an incoming setup attempt matches entries for both a calling party and called party and both entries have a policy constraint configured, the policy constraint associated with the called party will be assigned to the call.

In summary, with respect to interactions between address translation and policy-based calls, each network node (e.g., A) supports the ability for a policy constraint to be assigned to an address translation table entry. The following rules are applied by the node A for interactions between address translation functionality and policy-based calls. First, if a policy-based call is received, the policy constraint assigned through address translation will replace the policy constraint received as part of the initial call. Second, if a policy-based call is received and there is no policy constraint in the applicable address translation table entry, the policy constraint received as part of the initial call will still apply. Third, the policy constraint configured against a subscriber shall be ignored in the event that a policy constraint has already been assigned to the call via the applicable address translation table entry. Fourth, if a policy-based call is configured against a subscriber and there is no policy constraint in the applicable address translation table entry, the policy constraint configured against the subscriber will still apply.

Figure 3:
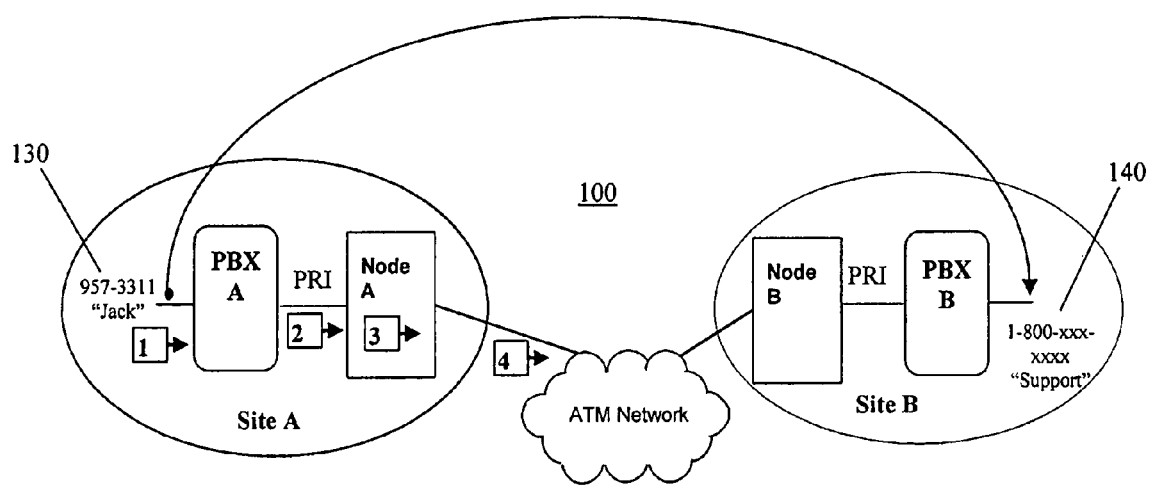
FIG. 3 is a block diagram illustrating the use of address translation and policy-based routing for a 1-800 number call in accordance with an embodiment of the invention; and, FIG. 4 is a flow chart illustrating operations of modules within the memory of a data processing system for policy-based routing of calls between nodes in a network, in accordance with an embodiment of the invention.

FIG. 3 is a block diagram illustrating the use of address translation and policy-based routing for a 1-800 number call in accordance with an embodiment of the invention. FIG. 3 illustrates a scenario where a SP wishes all 1-800 numbers called by node A to use a specific allocation of resources (e.g., path, bandwidth, etc.) via a policy constraint as 1-800 numbers are considered a high priority (e.g., as they are typically customer support numbers). In FIG. 3, the 1-800-xxx-xxxx number 140 represents a "Support" number being called by subscriber "Jack" who is calling from, for example, his home number 957-3311 130. In the case of policy-based routing address translation, there may or may not be digit translation. In the example of FIG. 3, there is no digit translation. This implies that the called number (i.e., who subscriber "Jack" is calling to) is 1-800-xxx-xxxx 140 and the calling number (i.e., where subscriber "Jack" is calling from) is 957-3311 130 and these numbers remain unchanged throughout the network 100. An address translation table entry is used to detect that a 1-800 number (e.g., 1-800-xxx-xxxx 140) is being called. It then applies a policy constraint to that call so that the call can take advantage of the routing characteristics associated with policy-based routing as described above. In particular, in FIG. 3, at step 1, the number 1-800-xxx-xxxx 140 for "Support" is received at private branch exchange ("PBX") A at site A from "Jack" whose number is 957-3311 130. Hence the called address is 1-800-xxx-xxxx 140 and the calling address is 957-3311 130. At step 2, PBX A sends the called address to node A (e.g., a router or switch). Node A at site A is coupled over the ATM network 100 to node B at site B. Node B at site B is coupled to PBX B which services the "Support" operation. Note that "PRI" in FIG. 3 represents "primary rate". That is, the connection between PBX A and node A is a T1 or E1 line. At step 3, node A uses address translation to assign a policy constraint to the call. At step 4, the call progresses through the ATM network 100 as bound by the policy constraint. As explained above, policy-based routing in the ATM network 100 ensures that the call has adequate bandwidth, etc., to reach its destination (i.e., "Support") at site B.

According to one embodiment, the assigning of a policy constraint index against an address translation table entry may be applied to either a called number (e.g., the "1-800-xxx-xxxx" number in FIG. 3) or a calling number (e.g., the "957-3311" number in FIG. 3). In the case of a calling number, for example, "Jack" at calling number "957-3311" may be a very important person ("VIP") whose calls are always to be considered as high priority. As such, regardless of what number Jack calls from 957-3311, the call is routed through the network as a high priority call via policy-based routing and the method of the present invention.

The present invention provides several advantages. First, it provides a straight-forward means of allowing SVCs to participate at the call level with respect to selecting paths using policy-based routing (e.g., based on bandwidth consumption, regional rules, link types, etc.) in the overall network. Second, it provides an additional level of granularity for SPs to rely upon when provisioning and supporting SVC-based calls in a PNNI-based ATM network. This increased granularity ensures that SVC-based calls are not totally blocked or can be individually prioritized to ensure call completion for higher priority calls (e.g., such a 1-800 numbers to support operations). Third, it provides for called/calling party unique policy routing selection for SVC call services over a UNI or NNI from equipment that does not support policy routing.

Figure 4:
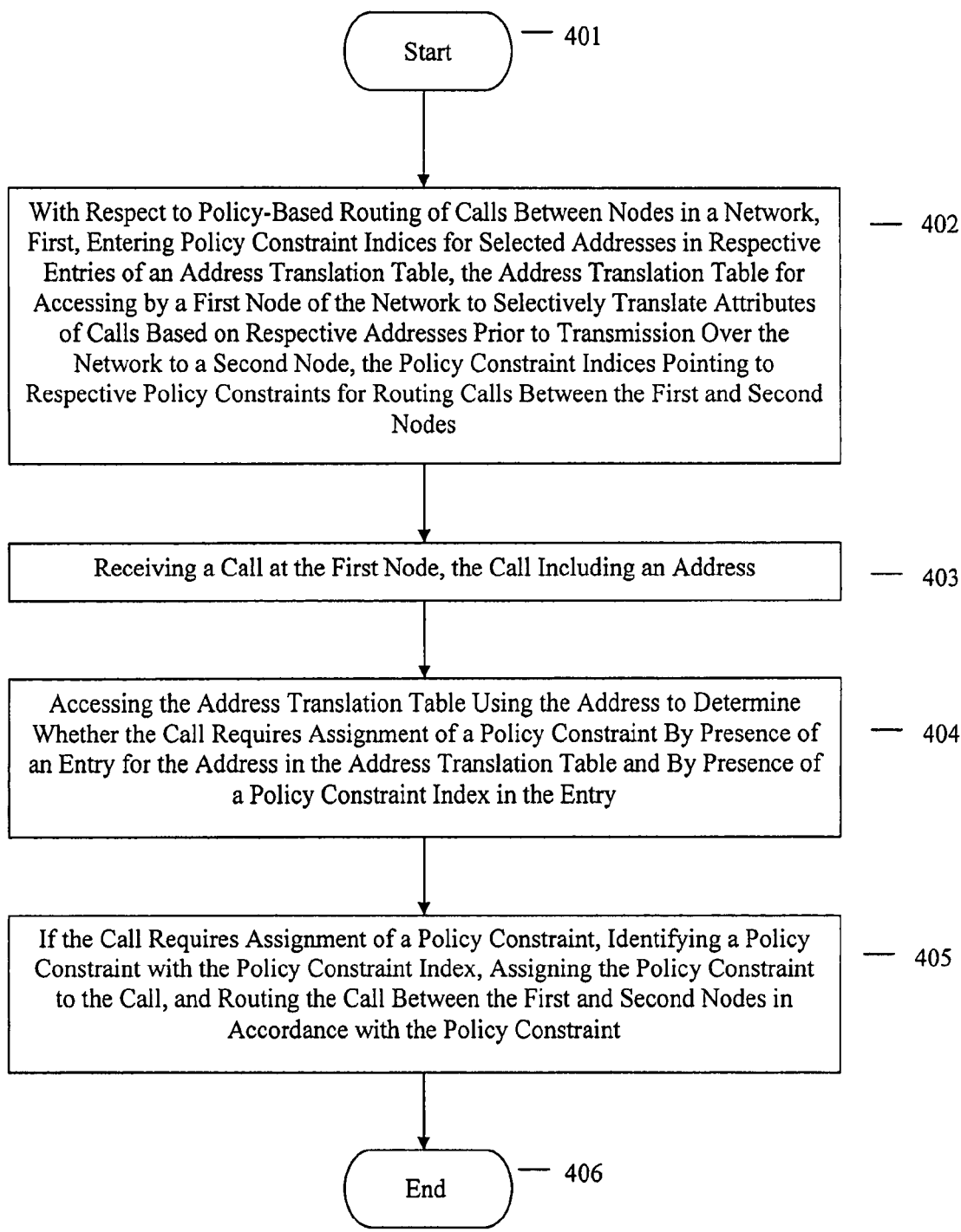

The above described method may be summarized with the aid of a flowchart. FIG. 4 is a flow chart illustrating operations 400 of modules 331 within the memory 330 of a data processing system (e.g., 300, A) for policy-based routing of calls between nodes (e.g., A, B) in a network 100, in accordance with an embodiment of the invention.

At step 401, the operations 400 start.

At step 402, policy constraint indices for selected addresses (e.g., called and/or calling addresses) are entered in respective entries of an address translation table, the address translation table for accessing by a first node A of the network 100 to selectively translate attributes of calls based on respective addresses prior to transmission over the network 100 to a second node B, the policy constraint indices pointing to respective policy constraints for routing calls between the first and second nodes A, B.

At step 403, a call is received at the first node A, the call including an address (e.g., 1-800-xxx-xxxx).

At step 404, the address translation table is accessed using the address to determine whether the call requires assignment of a policy constraint by presence of an entry for the address in the address translation table and by presence of a policy constraint index in the entry.

At step 405, if the call requires assignment of a policy constraint, a policy constraint is identified with the policy constraint index, the policy constraint is assigned to the call, and the call is routed between the first and second nodes A, B in accordance with the policy constraint.

At step 406, the operations 400 end.

In the above method, the network 100 may be an asynchronous transfer mode ("ATM") network 100. The asynchronous transfer mode ("ATM") network 100 may be a private network-to-network interface ("PNNI") based network 100. The policy constraint may be a private network-to-network interface ("PNNI") policy constraint for policy-based routing. The policy constraint may include one or more rules for accessing network resources for the call. The call may be a switched virtual connection ("SVC") based call. The address may be one of a called address and a calling address. The method may further include accessing the address translation table using the address to determine whether the call requires translation of one or more attributes of the call by presence of an entry for the address in the address translation table; and, if the call requires translation of one or more attributes of the call, the one or more attributes may be identified from the entry and the one or more attributes may be translated in accordance with the entry. The one or more attributes may include a prefix for the address. And, the first and second nodes A, B may be first and second routers (or switches), respectively, and the step of entering 402 may be performed by a network management system 300 which transmits the address translation table to the first node A.

According to one embodiment of the invention, the above described method may be implemented by a NMS (e.g., 300) rather than by, or in combination with, a network node (e.g., A, B, C, D in FIG. 2).

While this invention is primarily discussed as a method, a person of ordinary skill in the art will understand that the apparatus discussed above with reference to a data processing system 300, A, may be programmed to enable the practice of the method of the invention. Moreover, an article of manufacture for use with a data processing system 300, A, such as a pre-recorded storage device or other similar computer readable medium including program instructions recorded thereon, may direct the data processing system 300, A to facilitate the practice of the method of the invention. It is understood that such apparatus and articles of manufacture also come within the scope of the invention.

In particular, the sequences of instructions which when executed cause the method described herein to be performed by the data processing system 300, A can be contained in a data carrier product according to one embodiment. This data carrier product can be loaded into and run by the data processing system 300, A. In addition, the sequences of instructions which when executed cause the method described herein to be performed by the data processing system 300, A can be contained in a computer software product (e.g., software modules) according to one embodiment. This computer software product can be loaded into and run by the data processing system 300, A. Furthermore, the sequences of instructions which when executed cause the method described herein to be performed by the data processing system 300, A can be contained in an integrated circuit product (e.g., hardware modules) including a coprocessor or memory according to one embodiment. This integrated circuit product can be installed in the data processing system 300, A. Moreover, the sequences of instructions which when executed cause the method described herein to be performed can be contained in an integrated circuit product (e.g., hardware modules, a field programmable gate array ("FPGA"), an application specific integrated circuit ("ASIC"), etc.) according to one embodiment. This integrated circuit product can be installed in the data processing system 300, A.

The embodiments of the invention described above are intended to be exemplary only. Those skilled in this art will understand that various modifications of detail may be made to these embodiments, all of which come within the scope of the invention.

What is claimed is:

1. A method for policy-based routing of a call between a first node and a second node in an asynchronous transfer mode (ATM) network, comprising:

maintaining policy constraint indices for selected addresses in respective entries of an address translation table, the address translation table accessed by the first node of the ATM network to selectively translate attributes of calls based on respective addresses prior to transmission over the ATM network to the second node, the policy constraint indices pointing to respective policy constraints for routing calls between the first node and the second node;

receiving a call setup attempt at the first node, wherein the call set up attempt is a setup message including entries for both a calling party and a called party;

comparing the call setup attempt to the entries in the address translation table;

determining whether the call setup attempt requires assignment of a policy constraint by checking for matches to the entries for at least one of the calling party and the called party in the address translation table and by presence of policy constraint indices associated with at least one of the calling party and the called party; and, when the call setup attempt requires assignment of the policy constraint, identifying the policy constraint associated with the policy constraint index, assigning the policy constraint to the call setup attempt, and routing the call between the first and second nodes by performing path selection based upon the assigned policy constraint.

2. The method of claim 1, wherein the policy constraint is a private network-to-network interface ("PNNI") policy constraint for policy-based routing.

3. The method of claim 2, wherein the policy constraint includes one or more rules for accessing network resources for the call.

4. The method of claim 3, wherein the call is a switched virtual connection ("SVC") based call.

5. The method of claim 1, further comprising:

accessing the address translation table using the address to determine whether the call requires translation of one or more attributes of the call by presence of an entry for the address in the address translation table; and, if the call requires translation of one or more attributes of the call, identifying the one or more attributes from the entry and translating the one or more attributes in accordance with the entry.

6. The method of claim 5, wherein the one or more attributes include a prefix for the address.

7. The method of claim 1, wherein the first and second nodes are first and second routers, respectively, and the entering is performed by a network management system which transmits the address translation table to the first node.

8. The method of claim 1, further comprising:
determining whether the call setup attempt requires assignment of the policy constraint by checking for matches to the entries for both the calling party and the called party in the address translation table and by the presence of the policy constraint indices associated with both the calling party and the called party; and
assigning the policy constraint associated with the called party to the call.

9. The method of claim 1, further comprising:
determining whether the call setup attempt requires assignment of the policy constraint by checking for matches to the entry for only the called party in the address translation table and by the presence of the policy constraint index associated with the called party; and
assigning the policy constraint associated with the called party to the call.

10. The method of claim 1, further comprising:
determining whether the call setup attempt requires assignment of the policy constraint by checking for matches to the entry for only the calling party in the address translation table and by the presence of the policy constraint index associated with the calling party; and
assigning the policy constraint associated with the calling party to the call.

11. A system for policy-based routing of a call between the system and a node in an asynchronous transfer mode (ATM) network, comprising:
a processor coupled to memory and to an interface to the ATM network; and, modules within the memory and executed by the processor, the modules including:
a module that maintains policy constraint indices for selected addresses in respective entries of an address translation table, the address translation table accessed by the system to selectively translate attributes of calls based on respective addresses prior to transmission over the ATM network to the node, the policy constraint indices pointing to respective policy constraints for routing calls between the system and the node;
a module that receives a call set up attempt, wherein the call set up attempt is a setup message including entries for both a calling party and a called party;
a module that compares the call setup attempt to the entries in the address translation table;
a module that determines whether the call setup attempt requires assignment of a policy constraint by checking for matches to the entries for at least one of the calling party and the called party in the address translation table and by presence of policy constraint indices associated with at least one of the calling party and the called party; and
a module that, when the call setup attempt requires assignment of the policy constraint, identifies the policy constraint associated with the policy constraint index, assigns the policy constraint to the call setup attempt, and routes the call between the system and node by performing path selection based upon the assigned policy constraint.

12. The system of claim 11, wherein the policy constraint is a private network-to-network interface ("PNNI") policy constraint for policy-based routing.

13. The system of claim 12, wherein the policy constraint includes one or more rules for accessing network resources for the call.

14. The system of claim 13, wherein the call is a switched virtual connection ("SVC") based call.

15. The system of claim 11, further comprising:
a module for accessing the address translation table using the address to determine whether the call requires translation of one or more attributes of the call by presence of an entry for the address in the address translation table; and
a module for, if the call requires translation of one or more attributes of the call, identifying the one or more attributes from the entry and translating the one or more attributes in accordance with the entry.

16. The system of claim 15, wherein the one or more attributes include a prefix for the address.

17. The system of claim 11, wherein the system and the node are routers and a network management system coupled to the system enters the policy constraint indices for selected addresses in respective entries of the address translation table and transmits the address translation table to the system.

18. The system of claim 11, further comprising:
a module that determines whether the call setup attempt requires assignment of the policy constraint by checking for matches to the entries for both the calling party and the called party in the address translation table and by the presence of the policy constraint indices associated with both the calling party and the called party; and
a module that assigns the policy constraint associated with the called party to the call.

19. The system of claim 11, further comprising:
a module that determines whether the call setup attempt requires assignment of the policy constraint by checking for matches to the entry for only the called party in the address translation table and by the presence of the policy constraint index associated with the called party; and
a module that assigns the policy constraint associated with the called party to the call.

20. The system of claim 11, further comprising:
a module that determines whether the call setup attempt requires assignment of the policy constraint by checking for matches to the entry for only the calling party in the address translation table and by the presence of a policy constraint index associated with the calling party; and
a module that assigns the policy constraint associated with the calling party to the call.

* * * * *